United States Patent [19]
Johansson

[11] Patent Number: 5,034,570
[45] Date of Patent: Jul. 23, 1991

[54] ARRANGEMENT FOR A GUIDE DEVICE FOR LINES

[75] Inventor: Rolf Johansson, Trosa, Sweden
[73] Assignee: Saab-Scania Aktiebolag, Sweden
[21] Appl. No.: 378,200
[22] PCT Filed: Nov. 15, 1988
[86] PCT No.: PCT/SE88/00609
§ 371 Date: Jun. 21, 1989
§ 102(e) Date: Jun. 21, 1989
[87] PCT Pub. No.: WO89/05049
PCT Pub. Date: Jun. 1, 1989

[30] Foreign Application Priority Data
Nov. 17, 1987 [SE] Sweden ............................. 8704506

[51] Int. Cl.⁵ .............................................. B60N 2/06
[52] U.S. Cl. ..................................... 191/12 R; 248/51
[58] Field of Search .................. 191/12 R; 248/51, 52; 137/355.16; 296/65.1

[56] References Cited

U.S. PATENT DOCUMENTS

| | | | |
|---|---|---|---|
| 3,433,889 | 3/1969 | De Vries, Jr. | 191/12 R X |
| 3,541,334 | 11/1970 | Sobolewski | 378/194 |
| 3,630,325 | 12/1971 | Corl | 191/12 C |
| 3,833,774 | 9/1974 | Mills | 191/12 R |
| 4,204,255 | 5/1980 | Cremer | 296/65.1 X |
| 4,620,339 | 11/1986 | Shepheard | 191/12 R X |

FOREIGN PATENT DOCUMENTS 1033299 7/1958 Fed. Rep. of Germany.
819862 9/1959 United Kingdom ............ 191/12 R

*Primary Examiner*—David A. Bucci
*Attorney, Agent, or Firm*—Ostrolenk, Faber, Gerb & Soffen

[57] ABSTRACT

A vehicle seat disposed in a vehicle is movable longitudinally in the vehicle. A guide device guides a line, e.g. an electrical or a pneumatic line, between a fixed position in the vehicle and the movable seat and guides it as the seat shifts longitudinally. The line is formed of relatively rigid material with elastic properties which is bendable, e.g. from a stiff, elastic covering over the line. The guide device includes two spaced apart, horizontal, support pieces extending in the longitudinal direction. The line is bent into a U and the legs of the U bear against respective support pieces. The length of the line is such that the line retains its U-shape as the seat shifts longitudinally. The support pieces have respective side walls which define an opening between them through which the line projects to the seat. The front part of the line that is attached to the seat is bent off the support piece at an angle.

18 Claims, 2 Drawing Sheets

ARRANGEMENT FOR A GUIDE DEVICE FOR LINES

BACKGROUND OF THE INVENTION

The invention relates to an arrangement for a guide device which is fixed relative to a wall or floor panel in order to guide in a vehicle at least one line, for example an electricity line or an air line, which is enclosed in a covering, from a floor or wall panel to a vehicle seat which is arranged displaceably in the longitudinal direction of the vehicle.

It is known to improve the comfort of the driver in vehicles by arranging the vehicle seats in such a manner that these are displaceable longitudinally in the driving compartment of the vehicle. A vehicle seat arranged in such a manner gives rise, however, to problems when, for reasons of comfort, it is equipped with pneumatic cushioning or with a component which consumes electricity, for example a heating element for warming the sitting surface of the seat. During the displacement movement it is of course necessary that the air line which supplies the pneumatic cushioning arrangement with air and the electricity lines which supply the heating element with electricity must be so long that during the displacement movement they can follow the seat to its respective end positions.

In displaceably arranged seats commonly found on the market, the lines lie or hang uncontrolled and unprotected under the seat. The lines are thus exposed relatively easily to damage which can result in functional disorders in both the pneumatic cushioning arrangement and the heating element.

The problem is especially noticeable in lorries with a so-called sleeper cab in which a bed is hinged between a use position and a non-use position behind the vehicle seats.

In such a cab it is namely possible to displace at least the passenger seat between a front end position close to the dashboard when the bed is in the use position and a rear end position close to the rear wall of the cab when the bed is not in the use position.

Since the seat is displaceable through a relatively long distance, long lines are necessary to supply the pneumatic cushioning arrangement with air and the heating element with electricity. When the seat is displaced towards its rear end position, these lines extend in an uncontrolled and unprotected manner across the cab floor in front of the seat and impair the confort in the cab. When on the other hand the seat is displaced towards its front end position, the lines extend across the cab floor behind the seat and impair the freedom of movement when the beds are to be used.

SUMMARY OF THE INVENTION

The object of the invention is to eliminate the aforementioned problem in order to facilitate a displacement movement of the seat between a front end position close to the dashboard and a rear end position close to the rear wall of the cab, without the lines extending across the floor of the cab. To this end, the invention is characterized in that the guide device comprises two continuous support pieces which face one another and run substantially parallel and which are fixed relative to the wall or floor panel, that the line runs from the wall or floor panel into the guide device, whereupon the line bears against the one support piece and is bent into a U-shape to bear against the other support piece, and that the covering of the line is manufactured from a relatively rigid material with elastic properties by virtue of which the line, when bent into a U-shape, is pressed up against the support pieces which face one another.

Since the lines run in the guide device, they are well protected against external damage which can result in functional disorders in the pneumatic cushioning arrangement or the heating element of the seat. Moreover, the comfort in the driving compartment is improved since the lines do not extend across the cab floor.

BRIEF DESCRIPTION OF THE DRAWINGS

Other features which characterize the invention are given in the following patent claims and the description below of an embodiment exemplifying the invention. The description is carried out with reference to the attached drawings, in which

DESCRIPTION OF A PREFERRED EMBODIMENT

The description relates to the passenger side in a vehicle cab since a seat on this side is in many cases, for reasons of comfort, longitudinally displaceable through a longer distance than is the seat on the driver side. Notwithstanding this, there are no obstacles to applying the invention to a driver seat.

Figure 1:
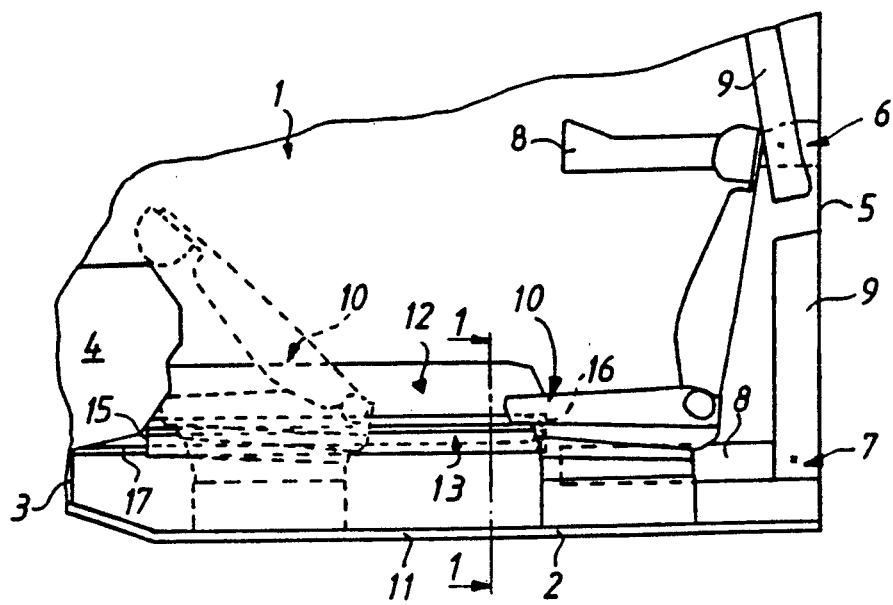
FIG. 1 shows a schematic side view of a lorry cab equipped with an arrangement for a vehicle seat according to the invention.

FIG. 1 shows the passenger side of a driving compartment 1 in a vehicle cab. The cab is provided with a floor 2, the front part of which is connected to a mainly vertical cowl wall 3 which delimits the driving compartment at the front.

Above the cowl wall 3, a dashboard is arranged. The driving compartment 1 is delimited at the rear by a wall 5 against which an upper and a lower bed 6, 7 are arranged. Each bed 6, 7 consists of a longer and a shorter part 8, 9 which are both arranged transversely in the driving compartment 1. The longer parts 8 are firmly connected to the rear wall 5 behind a driver seat (not shown) in a horizontal position substantially parallel to the floor 2, while the shorter parts 9 are hinged between an upper and a lower position in the rear wall 5 behind a passenger seat 10.

In its lower position, each shorter part 9 is in the same plane as the respective longer part 8, forming an upper and a lower continuous lying surface.

In its upper position, each shorter part 9 bears against the rear wall 5, whereupon a space is formed which makes possible the displacement of the seat 10 longitudinally between a front end position close to the dashboard 4 and a rear end position close to the rear wall 5, without its adjustment possibilities being restricted to any great extent by the beds 6, 7. In FIG. 1 the seat 10 is represented with broken lines in the front end position while it is represented with solid lines in the rear end position.

Figure 2:
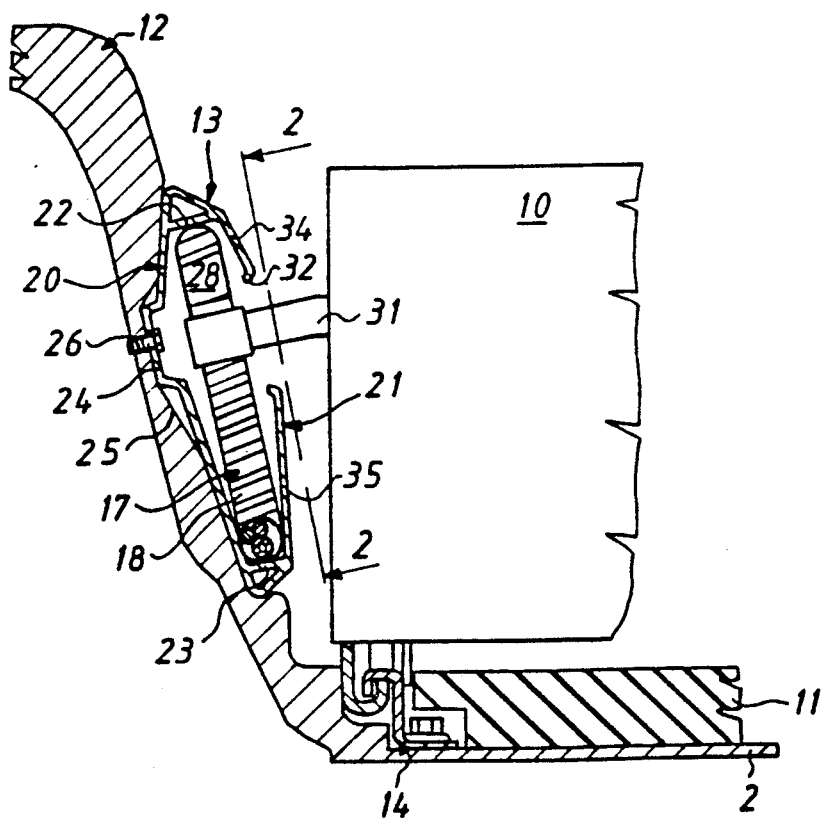
FIG. 2 shows a cross section substantially through 1—1 of FIGS. 1 and 3 of the arrangement according to the invention.

The seat 10 is displaceable longitudinally along rails 14 in the floor 2 which are shown in FIG. 2. The rails, which extend across the entire length of the driving compartment 1, are sunk into a rubber floor covering 11 which is attached to the floor 2. The floor covering is so thick that its upper surface lies on the same level as the upper part of the rails. Thus a flat floor surface is obtained in front of or behind the passenger seat respectively when it is in its end positions.

The vehicle cab is situated above the drive unit (not shown) of the vehicle. An engine cowl 12, which covers the drive unit, is arranged on the underside of the cab and projects into the driving compartment 1 between the vehicle seats.

The seat 10 is equipped with both a pneumatic cushioning arrangement and a heating element for warming its sitting surface.

In order to supply the pneumatic cushioning arrangement with air and the heating element with electricity, the pneumatic cushioning arrangement of the seat is connected via an air line to the compressed air system of the vehicle while the heating element is connected via a number of electricity lines to a central electricity supply on the dashboard 4.

All the lines running to the seat 10 are then gathered into a bundle of lines 17. The bundle of lines 17 is enclosed by a covering 18, preferably a spiral plastic covering. The covering 18 or alternatively one of the lines constituting the bundle of lines 17, for example the air line, is manufactured from a relatively rigid but flexible material with elastic properties. The covering is in this connection manufactured from a thermoplastic, preferably polythene.

A guide device intended for the bundle of lines 17, preferably a channel 13, is attached to the engine cowl 12. The channel 13 extends in the longitudinal direction of the driving compartment 1 substantially parallel to the cab floor 2. The front end part 15 of the channel 13 ends close to the dashboard 4 while its rear end part 16 ends close to the beds 6, 7.

The channel 13 consists of a continuous plastic profile which, in a cross section shown in FIG. 2, comprises a first side wall 20 facing towards the engine cowl 12, a second side wall 21 facing towards the vehicle seat 10 and a top part and bottom part 22, 23 which connect the side walls and are substantially parallel to one another. The plastic profile is advantageously manufactured from acrylonitrile-butadiene-styrene plastic (so-called ABS plastic).

The first side wall 20 is designed with a longitudinal recess 24 in the channel 13 which is arranged to fit in a corresponding longitudinal recess 25 in the engine cowl 12. A number of screw joints 26 are in this connection arranged in the recess 24 of the channel 13 to attach the channel 13 to the engine cowl 12.

Figure 3:
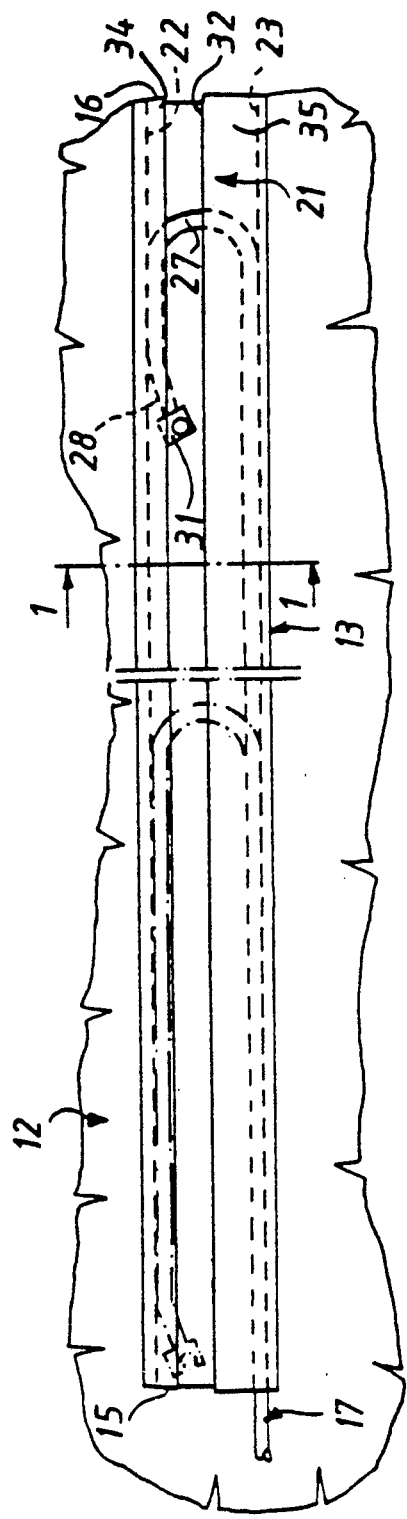
FIG. 3 shows a side view substantially through 2—2 of FIG. 2 of the arrangement according to the invention.

FIGS. 1 and 3 show that the bundle of lines 17 penetrates the cowl wall 3 and runs into the channel at the end 15 facing the dashboard and extends along its bottom part 23 towards the rear in the longitudinal direction of the vehicle. Close to the end 16 of the channel facing the bed, the bundle of lines 17 is bent upwards in a U-shaped bend 27 and subsequently extends towards the front in the longitudinal direction of the vehicle along the top part 22 of the channel.

The front part 28 of the bundle of lines 17 is bent downwards at an angle less than 90° from the top part 22, but preferably at approximately 15° from the said top part 22, and runs through a line lead-in 31 which, as is shown in FIGS. 2 and 3, goes through a longitudinal opening 32 in the front side wall 21 of the channel 13 and which divides the side wall 21 into an upper and lower part 34, 35. The upper and lower part 34, 35 thus form side supports for the bundle of lines 17 in the channel 13.

The line lead-in 31 comprises two casing halves divided in an axial plane, which are not described further and which are connected to one another by snap-locking. The casing halves are then connected to the seat 10 and contain the bundle of lines 17 and guide the lines constituting the bundle of lines 17 to the pneumatic cushioning arrangement and the heating element respectively.

The line lead-in 31 is also designed to fix the axial position of the bundle of lines 17 relative to the seat 10, in order to prevent the lines constituting the bundle of lines 17 from being subject to tensile stress at their connection points in the seat 10 during the longitudinal displacement movement of the seat 10.

Since the bundle of lines 17 displays elastic properties, it has a tendency to straighten itself out from its U-shaped 27 extension and adopt an essentially straight extension. Since the bundle of lines 17 is confined within the channel 13, this means that the bundle of lines 17 is continuously pressed against both the bottom part 23 and the top part 22 of the channel 13.

During the longitudinal displacement movements of the seat, the line lead-in 31, which is fixed to the seat, runs in the opening 32 of the second side wall 21 and carries with it the bundle of lines 17 between the position shown in FIG. 3 with broken lines, which corresponds to the rear end position of the seat 10, and the position shown with dotted broken lines, which corresponds to the front end position of the seat 10 close to the dashboard 4.

The channel in the embodiment example is manufactured from a continuous plastic profile. The channel can of couse be manufactured from an aluminium profile, a bent sheet-metal element or any other material with a suitable profile shape.

In the embodiment example it is also indicated that the covering or alternatively one of the lines constituting the bundle of lines is manufactured from a relatively rigid but flexible material with elastic properties. In an alternative embodiment, both a covering and lines can be used which lack the said properties, on the condition that the bundle of lines be supplemented with some other element which displays the properties.

The bundle of lines can in this connection be supplemented with, for example, a continuous plastic rod, or a plastic tube or similar, of which the sole purpose is to impart the said properties to the bundle of lines.

The invention must not be considered as being limited by the embodiments described but can within the framework of the following patent claims be modified into a number of alternative embodiments.

I claim:

1. A guide system, comprising (a) an elongate, bendable line that extends from a fixed part in a vehicle to a seat in the vehicle and (b) a guide device for guiding the line from the fixed part to the seat, wherein the vehicle seat is movable longitudinally in the vehicle;

the guide device comprising two spaced apart, opposed support pieces, which are fixed in location relative to the fixed part of the vehicle and which extend generally along the direction of longitudinal movement of the vehicle seat in the vehicle;

the line comprising a length of relatively rigid material with elastic properties, and the line being bendable but seeking to self restore to an unbent condition, the line being bent to define a U-shape having two legs, and the line being disposed in the guide device between the support pieces so that one leg of the U-shaped line bears against one of the support pieces and the other leg of the U-shaped line bears against the other of the support pieces, the line being of such length between the vehicle fixed part and the vehicle seat that the line is normally bent to define the U-shape thereof during the longitudinal movement of the vehicle seat, and the line maintaining the U-shape thereof and its bearing against the support pieces due to the rigidity of the line;

whereby as the seat is moved longitudinally, the line remains in and is guided between the support pieces; and wherein each of the support pieces includes a respective side wall which defines a side support for the respective leg of the line in the guide device, and wherein the side walls along the support pieces are sized and shaped to together define an elongate longitudinally extending opening between the side walls, through which opening the line extends from in the guide device to the seat.

2. The system of claim 1, wherein the support pieces extend substantially parallel, and wherein the one support piece is located above the other support piece.

3. The system of claim 2, wherein each support piece is a continuous element, and wherein the legs are continuously pressed against the support pieces.

4. The system of claim 1, further comprising a covering over the line, and the covering being comprised of a relatively rigid material with elastic properties for making the line relatively rigid, yet elastic.

5. The system of claim 1, wherein the support pieces are both located laterally outboard of the same lateral side of the vehicle seat and the same one side of both support pieces is the side thereof that is toward the vehicle seat.

6. The system of claim 1, further comprising a wall section joining the support pieces and spacing the support pieces apart.

7. The system of claim 6, wherein the wall section of the guide device is joinable to the fixed part of the vehicle.

8. The system of claim 1, further comprising a wall section joining the support pieces and spacing the support pieces apart, and the wall section is at the opposite side of the guide device from the side walls;

the wall section is joinable to the fixed part of the vehicle.

9. The system of claim 2, wherein the line has a front part which is the part of the line that is attached to the seat of the vehicle.

10. The system of claim 9, wherein the front part of the line is bent off the respective leg of the line and off one of the support pieces at an angle less than 90°.

11. The system of claim 10, wherein the front part of the line is bent off at an angle of approximately 15°.

12. The system of claim 4, wherein the covering is comprised of a spiral wound plastic covering over the line.

13. The guide system of claim 1, wherein the side walls on the support pieces are both at the same one side of both support pieces.

14. A guide system, comprising (a) an elongate, bendable line that extends from a fixed part in a vehicle to a seat in the vehicle, and (b) a guide device for guiding the line from the fixed part to the seat, wherein the vehicle seat is movable longitudinally in the vehicle;

the guide device comprising two spaced apart, opposed support pieces, which are fixed in location relative to the fixed part of the vehicle and which extend generally along the direction of longitudinal movement of the vehicle seat in the vehicle, and a wall section joining the support pieces and spacing the support pieces apart, wherein the fixed part of the vehicle has a recess defined in it and the wall section of the guide device includes means for fitting into the vehicle recess;

the line comprising a length of relatively rigid material with elastic properties, and the line being bendable but seeking to self restore to an unbent condition, the line being bent to define a U-shape having two legs, and the line being disposed in the guide device between the support pieces so that one leg of the U-shaped line bears against one of the support pieces and the other leg of the U-shaped line bears against the other of the support pieces, the line being of such length between the vehicle fixed part and the vehicle seat that the line is normally bent to define the U-shape thereof during the longitudinal movement of the vehicle seat, and the line maintaining the U-shape thereof and its bearing against the support pieces due to the rigidity of the line;

whereby as the seat is moved longitudinally, the line remains in and is guided between the support pieces.

15. The system of claim 14, wherein the guide device is comprised of a plastics material.

16. The system of claim 15, wherein that plastics materials comprises acrylonitrile-butadiene-styrene.

17. A guide system, comprising (a) an elongate, bendable line that extends from a fixed part in a vehicle to a seat in the vehicle, and (b) a guide device for guiding the line from the fixed part to the seat, wherein the vehicle seat is movable longitudinally in the vehicle;

the guide device comprising two spaced apart, opposed support pieces, which extend substantially parallel, which are fixed in location relative to the fixed part of the vehicle and which extend generally along the direction of longitudinal movement of the vehicle seat in the vehicle, wherein each of the support pieces includes a respective side wall which defines a side support for the line in the guide device and the side walls on the support pieces are both at the same one side of both support pieces, the side walls along the support pieces being sized and shaped to together define an elongate longitudinally extending opening between the side walls, through which opening the line extends from in the guide device to the seat;

the line comprising a length of relatively rigid material with elastic properties, the line having a front part which is attached to the seat, the line including a lead in part at the front part of the line, the lead in part being fixed in the vehicle seat and extending through the opening between the side walls for moving along that opening during longitudinal displacement of the vehicle seat, and the line being bendable but seeking to self restore to an unbent condition, the line being bent to define a U-shape having two legs, and the line being disposed in the guide device between the support pieces so that one leg of the U-shaped line bears against one of the support pieces and the other leg of the U-shaped line bears against the other of the support pieces, the line being of such length between the vehicle fixed part and the vehicle seat that the line is normally bent to define the U-shape thereof during the longitudinal movement of the vehicle seat, and the line maintaining the U-shape thereof and its bearing against the support pieces due to the rigidity of the line;

whereby as the seat is moved longitudinally, the line remains in and is guided between the support places.

18. The system of claim 17, further comprising the line having a lead in part at the front part of the line, the lead in part being fixed in the vehicle seat, and the lead in part moving along the length of the support pieces during longitudinal displacement of the vehicle seat.

* * * * *